S. SHEARMAN.
Grain Cleaner.
No. 11,443.
Patented Aug. 1, 1854.
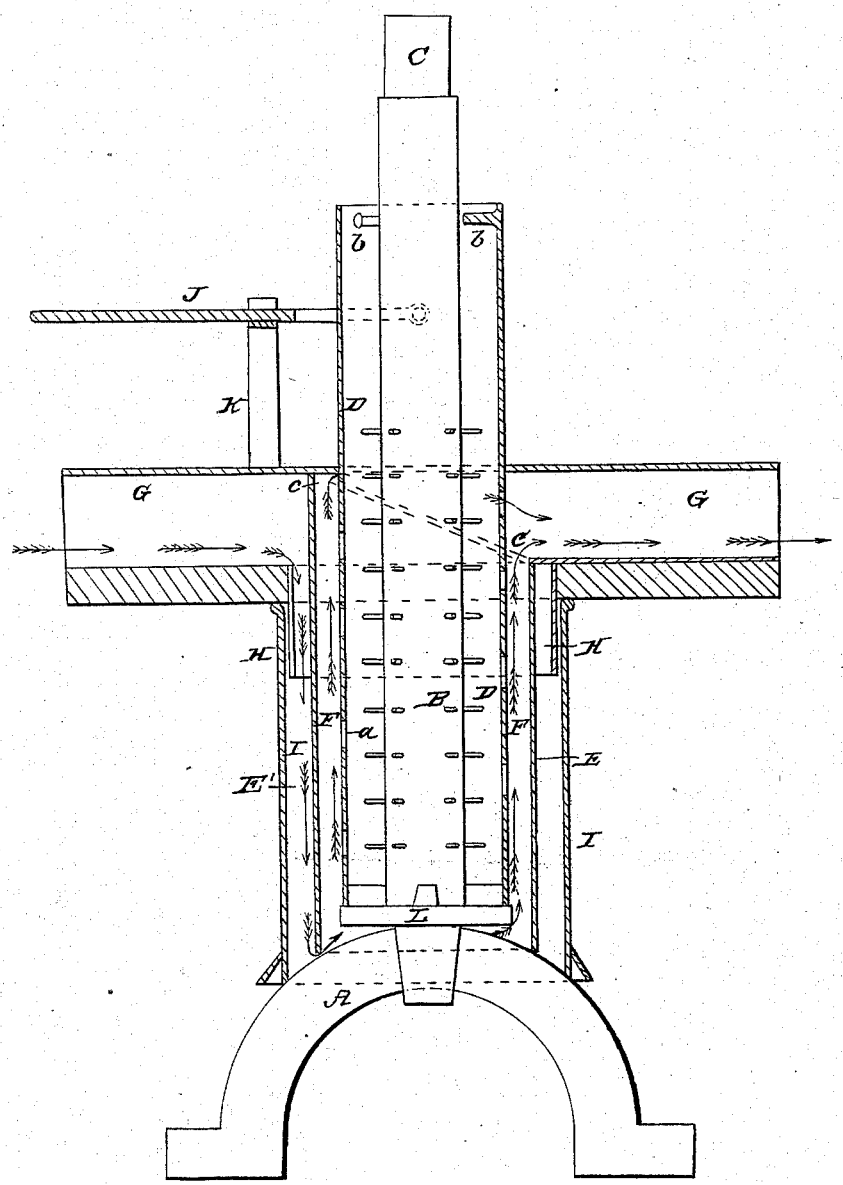

UNITED STATES PATENT OFFICE.

SIMEON SHEARMAN, OF GOSHEN, INDIANA.

METHOD OF CLEANING AND FEEDING IN GRAIN TO MILLSTONES.

Specification of Letters Patent No. 11,443, dated August 1, 1854.

*To all whom it may concern:*

Be it known that I, SIMEON SHEARMAN, of Goshen, in the county of Elkhart and State of Indiana, have invented certain new and useful Improvements in the Manner of Cleaning and Feeding in Grain to the Grinding-Stones; and I do hereby declare the following to be a full, clear, and exact description of the same, reference being had to the accompanying drawing, making a part of this specification.

To enable others skilled in the art to make and use my invention I will proceed to describe the same with reference to the drawings, premising that, the apparatus is intended to be placed in between the ordinary hopper and grinding stones.

A, represents the bail of the moving stone or runner of the pair, over or on which by a bridge tree or other suitable connections, so as to rotate with it, is placed the shaft B, suitably provided with spikes or other roughened surface for knocking off the smut, dirt, and other impurities from the grain. The top of the shaft B, has a journal C, upon it, which may be supported and turn in suitable boxes or bearings in the hopper. Around the shaft B, is arranged a stationary jacket or cylinder D, provided with suitable openings *a, a,* through which the dirt, smut, &c., knocked off from the grain by the teeth or beaters of the shaft, may pass. And in the top of this perforated jacket may be placed guides or projections *b*, to stay or steady the top of the shaft. Outside of the jacket D, and at sufficient distance therefrom, to form an air chamber F, between them is placed a tight cylinder E, which has an inclined top *c* so placed upon it, as to prevent any air from being drawn into it from the top, while the impurities may be driven through said air chamber between the cylinders and pass out freely, and be conveyed therefrom by a spout or tube out of the mill.

G is a case to which the cylinder E, is attached, and into one end of this case a blast or current of air is driven, as shown by the red arrows in the drawing. The blast passes down between the cylinder E, and a piece of cloth or leather H, suspended to the bottom of the case, which serves to give direction to the blast, and prevent its escape. The extreme outer cylinder I, is attached to and moves with the runner or top stone. By following the arrows it will be clearly seen how the air enters, passes through and escapes from the apparatus, carrying with it all the impurities separated from the grain. A lever J, is attached to the cylinder G, and a standard K, is so placed on the case G, as to support it. This lever is for the purpose of raising up the cylinder from the base L, on the shaft B, on which it would otherwise rest, and for forming a feed opening for the grain to pass through to the stones, and this can be regulated at pleasure, so as to cause a greater or less amount of cleaning of the grain, as may be required, and for proportionately increasing or diminishing the feed from the cylinder to the stones.

Having thus fully described the nature of my invention, what I claim therein as new, and desire to secure by Letters Patent, is—

The method herein set forth of cleaning and feeding in the grain to the mill stones, by passing it through a cleaning apparatus, which is placed in between the hopper and the stones, and driven by the stones in the manner and for the purpose as exemplified above.

SIMEON SHEARMAN.

Witnesses:
JOHN W. IRWIN,
GEORGE TAYLOR.